(12) United States Patent
Miyazaki et al.

(10) Patent No.: US 8,959,400 B2
(45) Date of Patent: Feb. 17, 2015

(54) SYSTEM, PROGRAM, AND METHOD FOR COLLECTING ERRORS WHICH OCCUR WHILE A USER USES A COMPUTER

(75) Inventors: Masashi Miyazaki, Kawasaki (JP); Tomohiro Shimizu, Yamato (JP); Tomonori Sugiura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 13/337,799

(22) Filed: Dec. 27, 2011

(65) Prior Publication Data

US 2012/0166883 A1    Jun. 28, 2012

(30) Foreign Application Priority Data

Dec. 27, 2010  (JP) ................................. 2010-290853

(51) Int. Cl.
*G06F 11/07* (2006.01)
*G06F 11/30* (2006.01)

(52) U.S. Cl.
CPC ........ *G06F 11/0766* (2013.01); *G06F 11/0793* (2013.01); *G06F 11/3058* (2013.01)
USPC .................... 714/45; 714/2; 706/54

(58) Field of Classification Search
USPC ............ 714/25, 26, 39, 2, 37, 45, 46; 706/48, 706/52, 54
See application file for complete search history.

(56) References Cited

U.S. PATENT DOCUMENTS

| | | | | |
|---|---|---|---|---|
| 5,243,689 A | * | 9/1993 | Yoshiura et al. ................ | 706/12 |
| 5,822,743 A | * | 10/1998 | Gupta et al. .................... | 706/50 |
| 6,026,393 A | * | 2/2000 | Gupta et al. .......................... | 1/1 |
| 6,473,659 B1 | * | 10/2002 | Shah et al. ....................... | 700/79 |
| 7,313,728 B2 | * | 12/2007 | Rhea et al. ....................... | 714/25 |
| 7,356,590 B2 | * | 4/2008 | Wilson et al. ................. | 709/224 |
| 7,647,528 B2 | * | 1/2010 | Yilmaz et al. ................. | 714/38.1 |
| 7,647,534 B2 | * | 1/2010 | Castellani et al. .............. | 714/46 |
| 7,984,007 B2 | * | 7/2011 | Reumann et al. ............... | 706/48 |

(Continued)

FOREIGN PATENT DOCUMENTS

| | | |
|---|---|---|
| JP | 7311679 | 11/1995 |
| JP | 2000010829 A | 1/2000 |

(Continued)

OTHER PUBLICATIONS

International Business Machines Corporation, JP Application No. 2010-290853, Japanese Office Action Dated Aug. 19, 2014 received in JP Counterpart Application No. 2010-290853., Pertinent page with translation attached, pp. 1-7.

*Primary Examiner* — Joseph Schell
(74) *Attorney, Agent, or Firm* — Holland & Knight LLP; Brian J. Colandreo, Esq.; Jeffrey T. Placker, Esq.

(57) ABSTRACT

A method, computer program product, and computer system for collecting errors which occur while a user uses a computer includes collecting log information on an operating environment including an operating procedure from a computing device associated with a user; accumulating the collected log information; identifying, from the log information, a second operating procedure similar to the operating procedure, wherein the second operating procedure had an error occur and no longer includes the error, in response to receiving the log information corresponding to the operating procedure in which the error occurs; and providing the user with the second operating procedure included in the searched log information.

27 Claims, 9 Drawing Sheets

(56) References Cited

U.S. PATENT DOCUMENTS

| | | | |
|---|---|---|---|
| 8,150,787 B2 * | 4/2012 | Maturana | 706/46 |
| 2002/0129338 A1 * | 9/2002 | MacDonell | 717/126 |
| 2004/0199828 A1 * | 10/2004 | Cabezas et al. | 714/39 |

FOREIGN PATENT DOCUMENTS

| | | |
|---|---|---|
| JP | 2002032337 A | 1/2002 |
| JP | 2002297796 A | 10/2002 |
| JP | 2002351699 A | 12/2002 |
| JP | 2003233515 A | 8/2003 |
| JP | 2003345487 A | 12/2003 |
| JP | 2004021438 A | 1/2004 |
| JP | 2004295486 A | 10/2004 |
| JP | 2006099293 A | 4/2006 |
| JP | 2009213190 A | 9/2009 |

* cited by examiner

SYSTEM, PROGRAM, AND METHOD FOR COLLECTING ERRORS WHICH OCCUR WHILE A USER USES A COMPUTER

RELATED APPLICATIONS

This application claims the benefit of Japanese Patent Application Number 2010-290853 filed on Dec. 27, 2010, the entire contents of which are herein incorporated by reference.

TECHNICAL FIELD

The present invention relates collecting errors which occur while a user uses a computer, and more specifically to a system, program and method for presenting to a user which user operation or operating environment can avoid an error.

BACKGROUND

A technique whereby operation history information indicating a history of user operations on an electronic computer system, fault occurrence status information indicating a status of an occurrence of a fault, and environment information indicating an operating environment of an application are collected and the fault is analyzed based on standard environment information indicating an operating environment that ensures an operation of the application is known.

BRIEF SUMMARY

In the case where a software error occurs when a user is operating a computer, the user may not easily know which user operation or operating environment can avoid the error. In some embodiments, a system for collecting errors which occur while a user uses a user computer, includes: a collection section for collecting log information on an operating environment including a user's operating procedure from the user computer; an accumulation section for accumulating the collected log information; a search section for searching the accumulation section for log information corresponding to an operating procedure, which is similar to an operating procedure in which an error occurs and which includes no error, in response to receiving the log information corresponding to the operating procedure in which the error occurs; and an information providing section for providing the user with the operating procedure included in the log information searched for.

In one implementation, a computing system directed to collecting errors which occur while a user uses a computer, includes a processor and memory configured to perform operations including collecting log information on an operating environment including an operating procedure from a computing device associated with a user; accumulating the collected log information; identifying, from the log information, a second operating procedure similar to the operating procedure, wherein the second operating procedure had an error occur and no longer includes the error, in response to receiving the log information corresponding to the operating procedure in which the error occurs; and providing the user with the second operating procedure included in the searched log information.

One or more of the following features may be included. Identifying the second operating procedure may include searching the accumulated collected log information for the second operating procedure that may include at least a first operation matching a second operation where the error occurred. The second operating procedure may be identified from the log information, which includes at least the first operation matching the second operation where the error occurred, is similar to the operating procedure in which the error occurred, and includes no error. Statistic information for the second operating procedure similar to the operating procedure in which the error occurred may be calculated based upon, at least in part, a plurality of operating procedures included in the searched log information. The computing device associated with the user may be provided with the calculated statistic information. A third operating procedure in which the error occurred may be detected. The computing device associated with the user may be provided with a fourth operating procedure that includes no error so that the user is provided with the fourth operating procedure which is similar to the detected third operating procedure and which includes no error.

A third operation procedure in which an error occurred and no longer includes the error may be collected. A fourth operating procedure may be provided in response to receiving log information corresponding to the third operating procedure in which the error occurred. The fourth operating procedure may be accumulated in association with the third operating procedure. The computing device associated with the user may be provided with the fourth operating procedure as an operating procedure for avoiding the error that occurred in the third operating procedure. A plurality of operations, including a first operation, may be extracted. Statistic information of the plurality of operating procedures may be calculated, which include at least a third operating procedure from the plurality of operating procedures that includes the first operation and where the specific error occurred and at least a fourth operating procedure from the plurality of operating procedures that includes the first operation and in which no error occurred. The computing device associated with the user may be provided with the calculated statistic information. A third operating procedure to be performed after the operating procedure in which the error occurred and no longer includes the error may be identified from the collected log information. The computing device associated with the user may be provided with the operating procedure in which the error occurred and the identified third operating procedure. A plurality of events generated by operations by the user may be detected, where the plurality of events may indicate a third operating procedure. The log information on the operating environment including the detected plurality of events may be collected.

In another implementation, a computer program product residing on a computer readable medium having a plurality of instructions stored on it. When executed by a processor, the instructions cause the processor to perform operations including collecting log information on an operating environment including an operating procedure from a computing device associated with a user; accumulating the collected log information; identifying, from the log information, a second operating procedure similar to the operating procedure, wherein the second operating procedure had an error occur and no longer includes the error, in response to receiving the log information corresponding to the operating procedure in which the error occurs; and providing the user with the second operating procedure included in the searched log information.

One or more of the following features may be included. Identifying the second operating procedure may include searching the accumulated collected log information for the second operating procedure that may include at least a first operation matching a second operation where the error occurred. The second operating procedure may be identified from the log information, which includes at least the first operation matching the second operation where the error occurred, is similar to the operating procedure in which the error occurred, and includes no error. Statistic information for the second operating procedure similar to the operating procedure in which the error occurred may be calculated based upon, at least in part, a plurality of operating procedures included in the searched log information. The computing device associated with the user may be provided with the calculated statistic information. A third operating procedure in which the error occurred may be detected. The computing device associated with the user may be provided with a fourth operating procedure that includes no error so that the user is provided with the fourth operating procedure which is similar to the detected third operating procedure and which includes no error.

A third operation procedure in which an error occurred and no longer includes the error may be collected. A fourth operating procedure may be provided in response to receiving log information corresponding to the third operating procedure in which the error occurred. The fourth operating procedure may be accumulated in association with the third operating procedure. The computing device associated with the user may be provided with the fourth operating procedure as an operating procedure for avoiding the error that occurred in the third operating procedure. A plurality of operations, including a first operation, may be extracted. Statistic information of the plurality of operating procedures may be calculated, which include at least a third operating procedure from the plurality of operating procedures that includes the first operation and where the specific error occurred and at least a fourth operating procedure from the plurality of operating procedures that includes the first operation and in which no error occurred. The computing device associated with the user may be provided with the calculated statistic information. A third operating procedure to be performed after the operating procedure in which the error occurred and no longer includes the error may be identified from the collected log information. The computing device associated with the user may be provided with the operating procedure in which the error occurred and the identified third operating procedure. A plurality of events generated by operations by the user may be detected, where the plurality of events may indicate a third operating procedure. The log information on the operating environment including the detected plurality of events may be collected.

In another implementation, a computer-implemented method includes collecting log information on an operating environment including an operating procedure from a computing device associated with a user; accumulating the collected log information; identifying, from the log information, a second operating procedure similar to the operating procedure, wherein the second operating procedure had an error occur and no longer includes the error, in response to receiving the log information corresponding to the operating procedure in which the error occurs; and providing the user with the second operating procedure included in the searched log information.

One or more of the following features may be included. Identifying the second operating procedure may include searching the accumulated collected log information for the second operating procedure that may include at least a first operation matching a second operation where the error occurred. The second operating procedure may be identified from the log information, which includes at least the first operation matching the second operation where the error occurred, is similar to the operating procedure in which the error occurred, and includes no error. Statistic information for the second operating procedure similar to the operating procedure in which the error occurred may be calculated based upon, at least in part, a plurality of operating procedures included in the searched log information. The computing device associated with the user may be provided with the calculated statistic information. A third operating procedure in which the error occurred may be detected. The computing device associated with the user may be provided with a fourth operating procedure that includes no error so that the user is provided with the fourth operating procedure which is similar to the detected third operating procedure and which includes no error.

A third operation procedure in which an error occurred and no longer includes the error may be collected. A fourth operating procedure may be provided in response to receiving log information corresponding to the third operating procedure in which the error occurred. The fourth operating procedure may be accumulated in association with the third operating procedure. The computing device associated with the user may be provided with the fourth operating procedure as an operating procedure for avoiding the error that occurred in the third operating procedure. A plurality of operations, including a first operation, may be extracted. Statistic information of the plurality of operating procedures may be calculated, which include at least a third operating procedure from the plurality of operating procedures that includes the first operation and where the specific error occurred and at least a fourth operating procedure from the plurality of operating procedures that includes the first operation and in which no error occurred. The computing device associated with the user may be provided with the calculated statistic information. A third operating procedure to be performed after the operating procedure in which the error occurred and no longer includes the error may be identified from the collected log information. The computing device associated with the user may be provided with the operating procedure in which the error occurred and the identified third operating procedure. A plurality of events generated by operations by the user may be detected, where the plurality of events may indicate a third operating procedure. The log information on the operating environment including the detected plurality of events may be collected.

The details of one or more implementations are set forth in the accompanying drawings and the description below. Other features and advantages will become apparent from the description, the drawings, and the claims.

DETAILED DESCRIPTION

Figure 1:
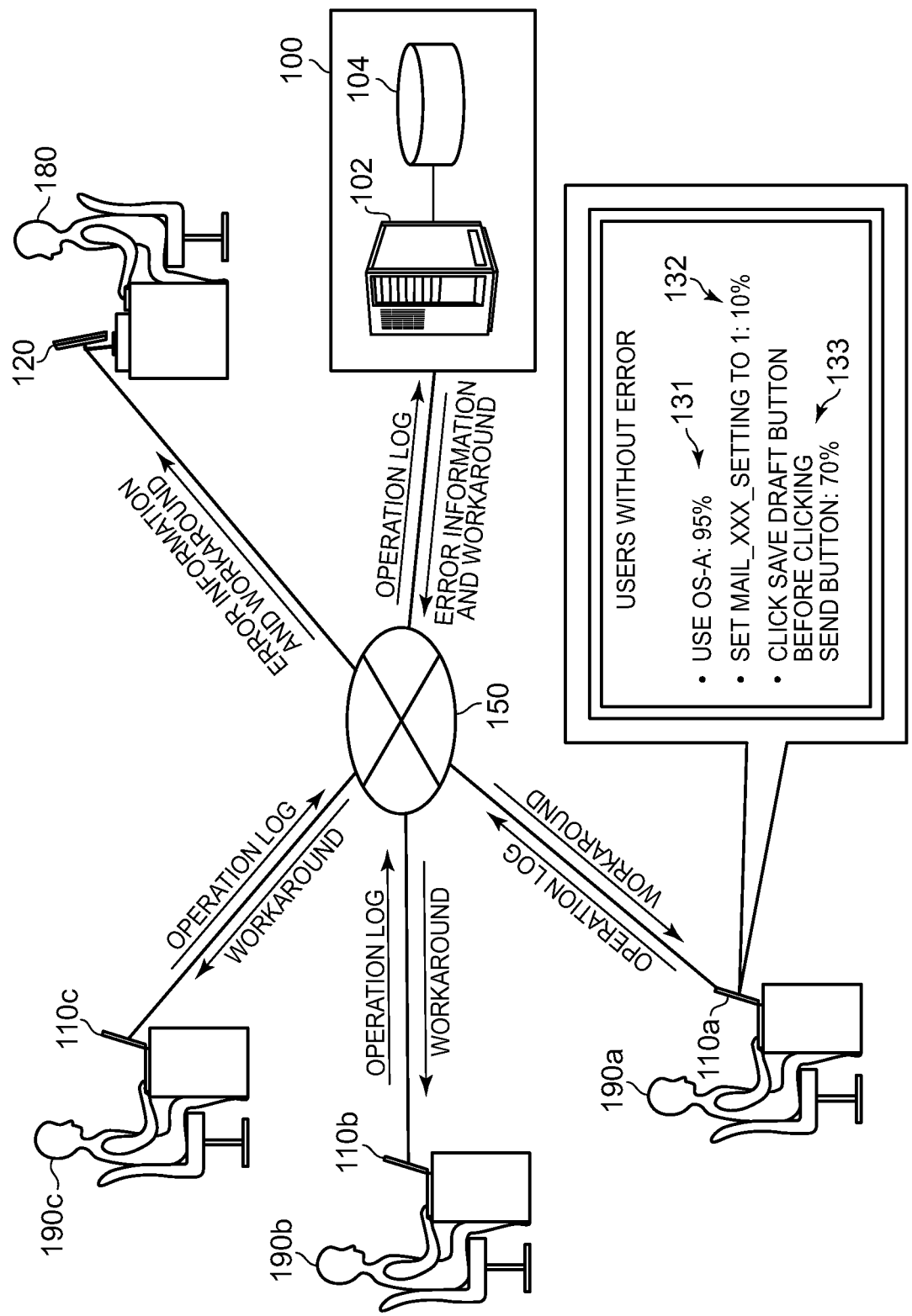
FIG. 1 is a diagram showing an overall structure of a system according to an embodiment of the present invention.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows an overall structure of a system according to an example embodiment. The system may include a server 100, a plurality of user terminals 110*a* to 110*c*, and a development computer 120. The plurality of user terminals 110*a* to 110*c* may also be collectively referred to as a plurality of user terminals 110 or each simply as a user terminal 110. The user terminals 110*a* to 110*c* may be respectively operated and used by users 190*a* to 190*c*. In the description of the embodiment, the plurality of users 190*a* to 190*c* may also be collectively referred to as a plurality of users 190 or each simply as a user 190.

The system may collect errors that occur while the user 190 uses the user terminal 110. The user terminal 110 may be an example of a user computer in the present disclosure. The user 190 may be an example of a user who uses the user computer in the present disclosure. A developer 180 may develop or maintains software running on the user terminals 110*a* to 110*c*, using the development computer 120. The user 190 and the developer 180 may each be a user of the system. In further detail, the user 190 and the developer 180 may each be an example of a user provided with a below-mentioned operating procedure and the like in the present disclosure.

Each user terminal 110 may operate upon receiving an operation from the corresponding user 190. The user terminal 110 may execute software that includes a function of detecting operations on the user terminal 110 and transmitting the detected operations as an operation log and a function of handling a workaround for an error. When the software is running on the user terminal 110, the user terminal 110 may continuously acquire an operation log that includes a sequence of operations by the user 190 and an operating environment, and may transmit the operation log to the server 100 via a network 150. In the case where an error occurs in the user terminal 110, the user terminal 110 may transmit an operation log that includes an operation at the time when the error occurs and information indicating that the error occurs, to the server 100 via the network 150. The error mentioned here may be an error caused by, for example, a factor in the user terminal 110, and may not an error substantially caused by an external factor such as a reception error of incoming mail.

The server 100 may acquire operation logs from the plurality of user terminals 110. The server 100 may include a storage device 104 for recording the operation logs, and an analysis device 102 for analyzing the operation logs recorded in the storage device 104. The storage device 104 may be capable of collecting operation logs of the case where no error occurs from the plurality of user terminals 110, and recording the collected operation logs. Thus, the storage device 104 may be capable of recording a user operation where no error occurs in the user terminal 110. In the case where the server 100 receives an operation log including information indicating that an error occurs from the user terminal 110, the analysis device 102 may search the operation logs recorded in the storage device 104, and may extract an operation that can avoid the error. In detail, the analysis device 102 may extract the operation that can avoid the error, from the operation logs of the case where no error occurs. The server 100 may transmit the extracted operation to the user terminal 110 as a workaround.

The workaround may include a workaround environment indicating an operating environment in which no error occurs. Examples of the workaround environment may include OS information 131 indicating a type of an operating system (OS) in which no error occurs, and setting information 132 indicating a software operation setting in which no error occurs. The workaround may also include a workaround operation indicating an operation where no error occurs. An example of information of the workaround operation may be operation information 133 indicating an operation on a user interface. The user terminal 110 may present the workaround to the user 190 by, for example, displaying the information included in the workaround on a display device.

The server 100 may periodically aggregate operation logs, and may transmit error information and a workaround to the development computer 120 of the developer 180. The development computer 120 may present the received error information and workaround to the developer 180. Examples of the error information may include an operating environment in which an error occurs, an operation where an error occurs, and the like.

In the system according to the example embodiment, operating environments in which no error occurs may be collected from the plurality of user terminals 110 and may be recorded in the storage device 104. In the case where an error occurs in one user terminal 110, an operating environment in which no error occurs may be extracted from the storage device 104 and may be presented to the user 190 of the user terminal 110 in which the error occurs. This enables the user to know which operation or environment can avoid the error. As a result, the user may be able to continue working using the software, without waiting for a factor of the error to be resolved by a software update and the like. In addition, in the system according to the embodiment, the developer 180 may be capable of knowing not only an operation or an environment, in which an error occurs, but also an operation or an environment in which no error occurs. Accordingly, the developer 180 may be able to specify a factor that causes the error.

Figure 2:
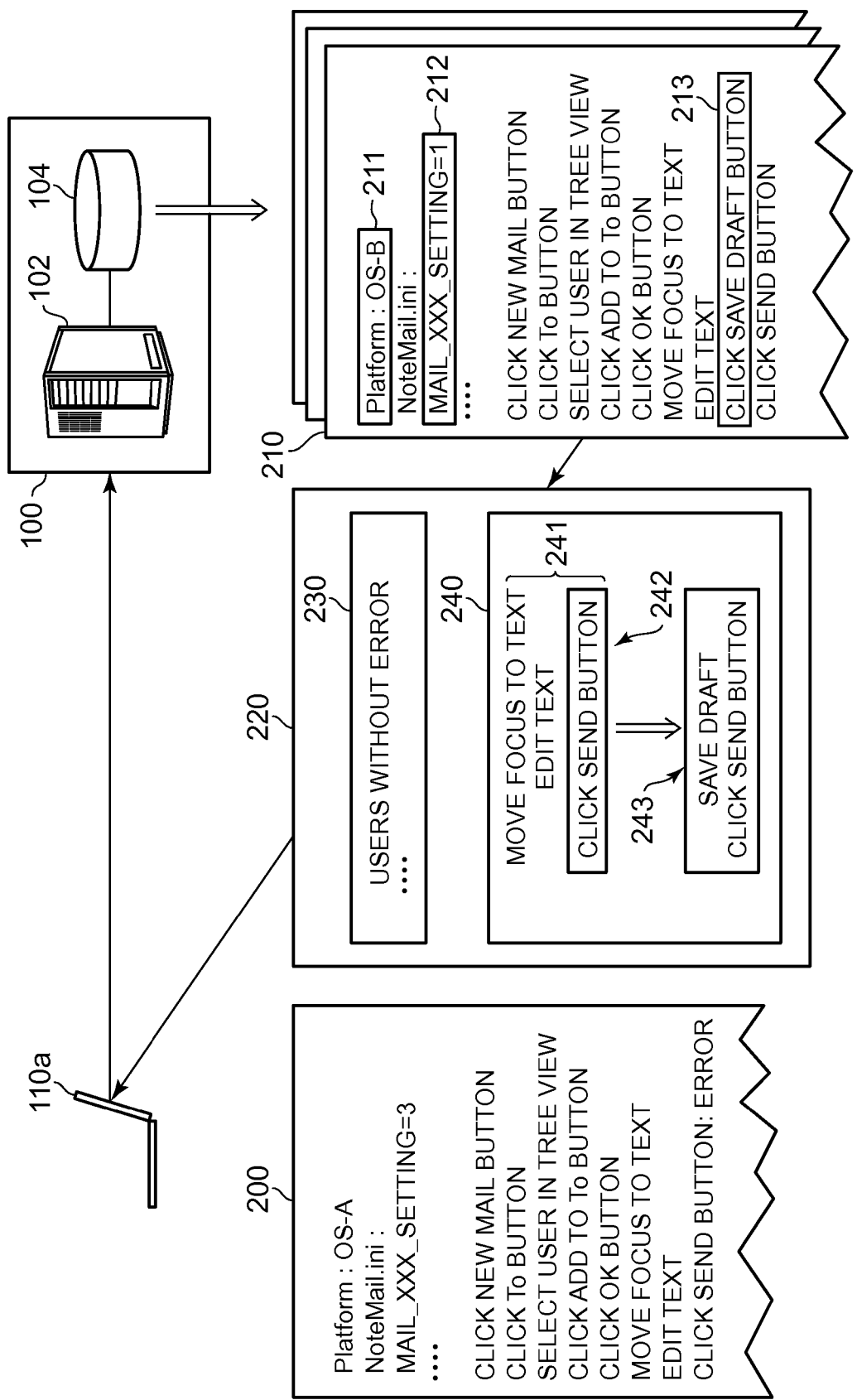
FIG. 2 is a diagram showing an example of log information and a workaround.

FIG. 2 shows an example of log information and a workaround. Log information 200 may include OS information, setting information, and operation information. "OS-A" shown as an example of the OS information may be information indicating a type of an OS. The type of the OS may include version information of the OS.

"MAIL_XXX_SETTING=3" shows as an example of the setting information which may specify an operation setting parameter of the software. The operation setting parameter may include a setting item such as "MAIL_XXX_SETTING" and a setting value such as "3". The operation setting parameter may be read from a setting file and reflected on the operation of the software, when the software starts. The setting information may include setting information of the OS. For example, the setting information of the OS may be read from the setting file and may be reflected on the operation of the OS, when the OS starts. The setting information of the OS may include an environment variable set in the OS. The log information 200 may include information specifying the setting file, such as "NoteMail.ini", as the setting information.

The log information 200 may include an operating procedure by the user 190, as an operation log. For instance, the log information 200 may include information specifying an operation such as "click New Mail button". In the case where no error occurs, the user terminal 110 may periodically transmit log information. In the case where an error occurs, information indicating the error may be added to the log information 200. Information indicating a timing at which the error occurs may also be included. For example, the information indicating the error may be added to an operation performed immediately before the error occurs. As illustrated in FIG. 2, the log information 200 may include the operating environment including the OS information and the setting information, and the operation log indicating the operating procedure.

In the server 100, the analysis device 102 may function as a collection section for collecting log information on an operating environment that may include the user's operating procedure from the user terminal 110, and the storage device 104 may function as an accumulation section for accumulating the collected log information. The analysis device 102 may also function as a search section for searching the storage device 104 for log information corresponding to an operating procedure, which may be similar to an operating procedure in which an error occurs and which may include no error, in response to receiving the log information corresponding to the operating procedure in which the error occurs.

In response to receiving the log information 200 corresponding to the operating procedure in which the error occurs, the analysis device 102 may search for a plurality of sets of log information stored in the storage device 104 and corresponding to operating procedures that may include no error. The analysis device 102 may create data of a workaround 220 to be transmitted to the user terminal 110. In detail, the analysis device 102 may create data of a workaround 230 to be presented to the user 190 and data of a workaround 240 to be executed by the user terminal 110.

The analysis device 102 may compare the log information 200 with a plurality of sets of log information searched for, may extract their differences, and may create statistic information for the differences. For example, log information 210 searched for may include OS information 211, an operation setting parameter 212, and an operation 213 that differ from those in the log information 200. The analysis device 102 may aggregate the plurality of operation logs searched for, and may calculate statistic information for each difference, to create the data of the workaround 230 that may be presented to the user 190. The workaround 230 may include the OS information 131, the setting information 132, and the operation information 133 illustrated in FIG. 1.

The workaround 240 may include, for instance, operating procedure information 241 and execution process information 243. The operating procedure information 241 may be operating procedure information indicating a condition that induces the error. In this example embodiment, the operating procedure information 241 may indicate that the error occurs when operations "move focus to text", "edit text", and "click Send button" are performed in this order.

The execution process information 243 may indicate a process to be executed by the user terminal 110. That is, the workaround 240 may be used to instruct the user terminal 110 to execute the process indicated by the execution process information 243 in the case where the operating procedure satisfying the condition indicated by the operating procedure information 241 is performed in the user terminal 110. The execution process information 243 may indicate a process to be executed instead of a specific process. In this example, the execution process information 243 may indicate that a process "save draft" and "click Send button" is to be executed instead of a process "click Send button" indicated by a process 242.

The analysis device 102 may transmit the data of the workaround 220 to the user terminal 110 in which the error occurs. Thus, the analysis device 102 may function as an information providing section for providing the user 190 with the operating procedure included in the log information. In this way, the server 100 may suggest to the user 190 which workaround may avoid the error. The server 100 may also provide the user terminal 110 with a process that may avoid the error. The user terminal 110 may automatically apply the process provided from the server 100, as a result of which the user 190 may work by operating the user terminal 110 without concern about whether or not the error occurs.

Figure 3:
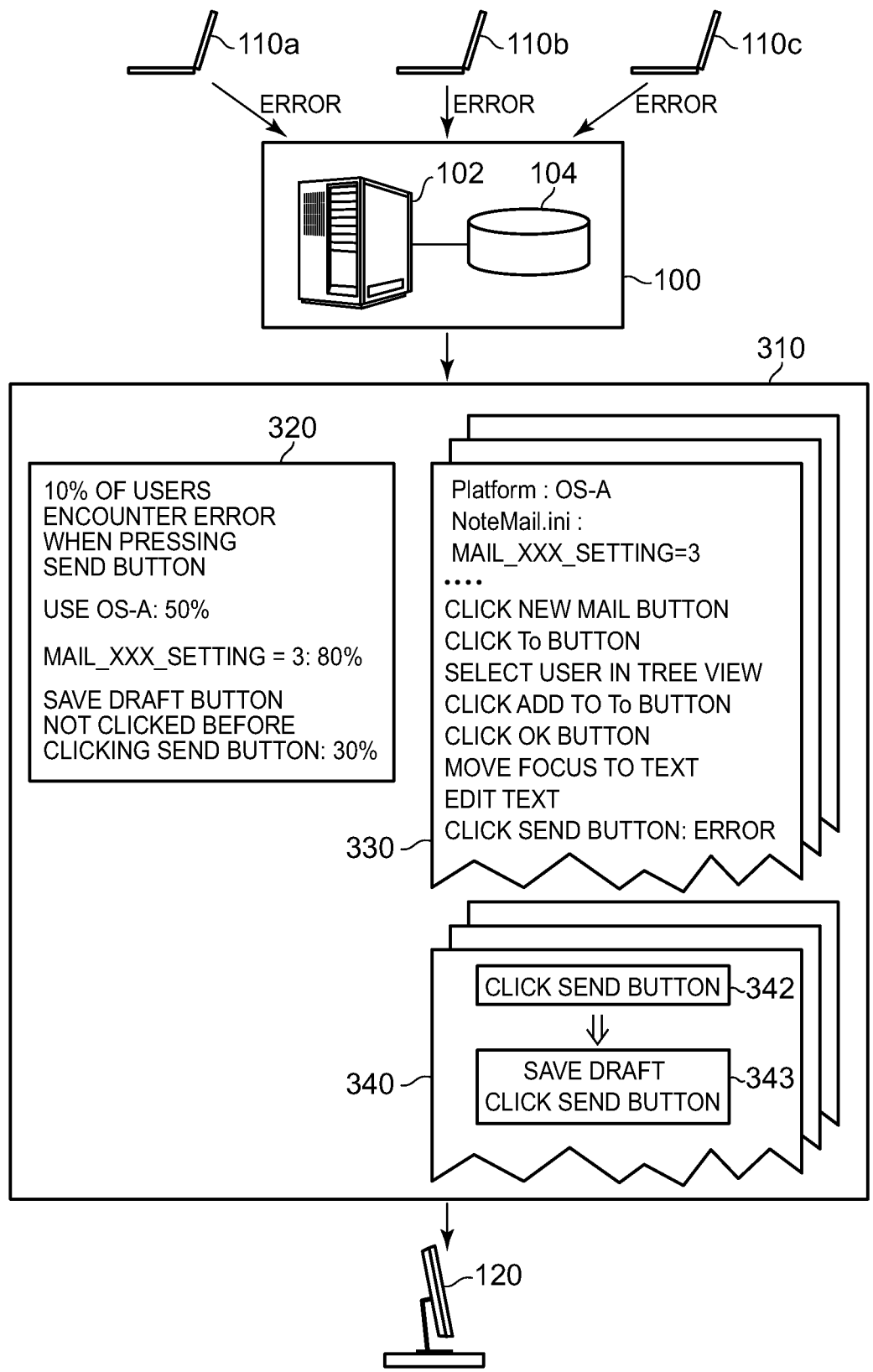
FIG. 3 is a diagram showing an example of error information and a workaround.

FIG. 3 shows an example of error information and a workaround that may be transmitted to the development computer 120. The server 100 may collect log information that may include an operating procedure in which an error occurs and log information that may include an operating procedure in which no error occurs from the plurality of user terminals 110, and may record the collected log information.

The analysis device 102 may search the storage device 104 for a plurality of operating procedures in which an error may occur. The analysis device 102 may create error-related information 310 that may include information indicating an operating environment in which the error may occur, based upon, at least in part, a plurality of sets of log information searched for. In detail, the analysis device 102 may compare log information of the case where the error may occur with log information of the case where no error occurs, may extract their differences, and may create the error-related information 310 that may include statistic information for the differences. The error-related information 310 may include error statistics 320 and an error-operating environment 330 as an example of error information, and information of a workaround 340.

The error-operating environment 330 may be a plurality of sets of log information of the case where the error may occur, such as the log information 200. The workaround 340 is, for example, a workaround corresponding to the error operating environment 330 illustrated in FIG. 3. In detail, a process 342 may correspond to the process 242 in FIG. 2, and execution process information 343 may correspond to the execution process information 243 in FIG. 2.

As illustrated in FIG. 3, the error statistics 320 may include information indicating an occurrence frequency of a specific error such as "error that occurs when pressing Send button". For example, the error statistics 320 may include information "10% of users encounter error when pressing Send button". This may enable the developer 180 to, for instance, determine an error of a high occurrence frequency as a serious error and deal with the error with priority.

The error statistics 320 may include information of an error occurrence frequency for each OS type, such as "use OS-A: 50%". The error statistics 320 may also include information of an error occurrence frequency for each operation setting parameter, such as "MAIL_XXX_SETTING=3: 80%". The error statistics 320 may further include information of an error occurrence frequency for each operation, such as "Save Draft button not clicked before clicking Send button: 30%". This may enable the developer 180 to understand in which operation or environment the error occurs frequently.

With the error-related information 310 illustrated in FIG. 3, the developer 180 may easily understand which specific operation performed by the user 190 in which environment results in the occurrence of the error. Moreover, by comparing the operating environment in which the error occurs with the workaround, the developer 180 may be able to find which part of the program contains a factor of the error. Hence, the developer 180 may be able to easily determine how the program needs to be specifically modified to avoid the error, as compared with the case of, for example, performing the determination based only on a memory status at the time when the error occurs and calls stack information of the program.

Though the error-related information 310 may be provided to the developer 180 in the system according to the embodiment, the error-related information 310 may also be provided to the user 190. For instance, the error-related information 310 may be provided to the user 190 early as fault information. Besides, widely providing the error-related information 310 to the user 190 as fault information may contribute to early finding of the workaround.

Figure 4:
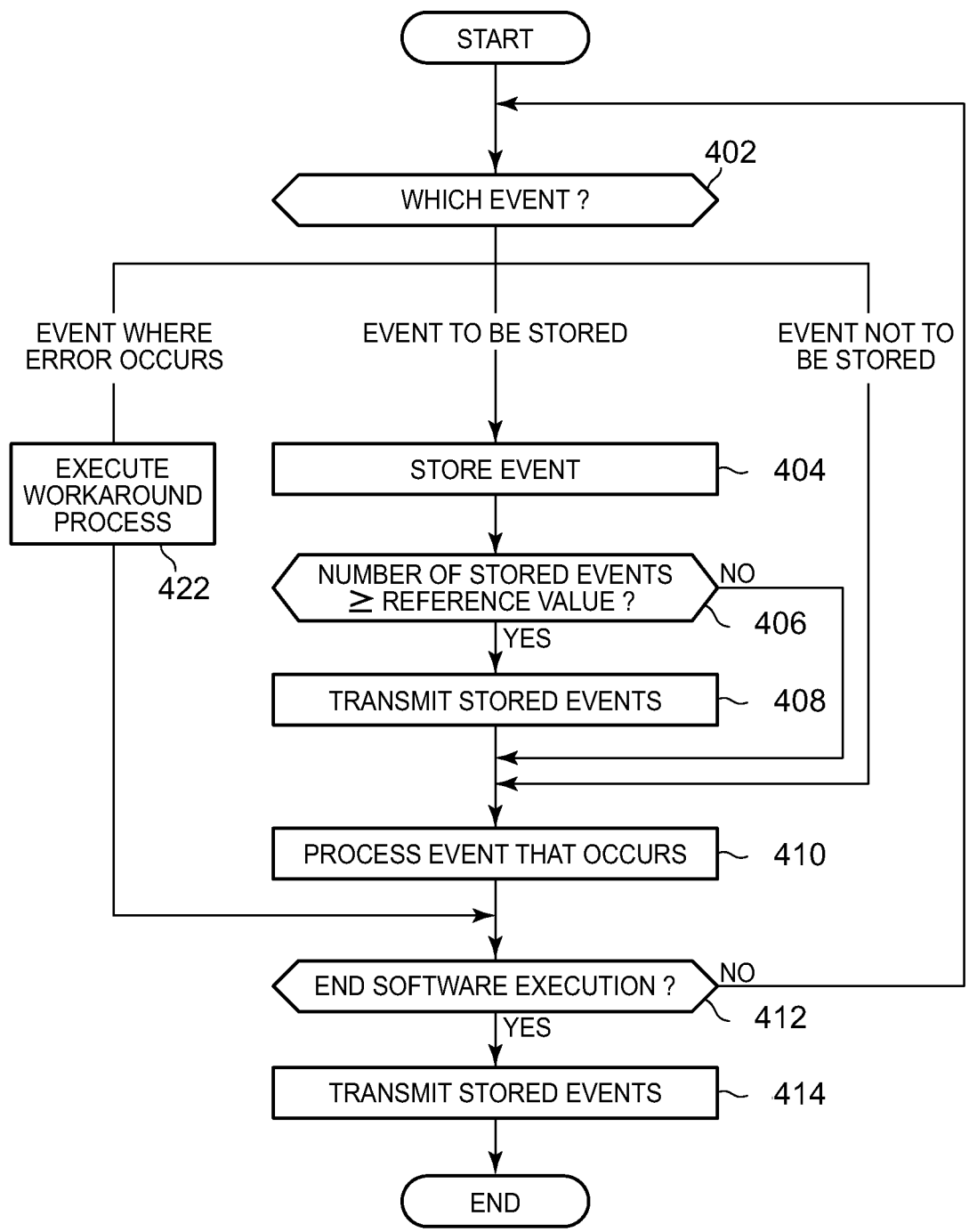
FIG. 4 is a diagram showing an example of an operating flow of a user terminal 110.

FIG. 4 shows an example of an operation flow of the user terminal 110. For instance, an operation log acquisition process may be realized by a software module that is called in response to an occurrence of an event by an operation of the user 190, and may be incorporated in software that is subjected to error detection. When the event occurs, the user terminal 110 may determine 402 the event that occurs. The user terminal 110 may determine 402 whether the event is an event to be stored, an event not to be stored, or an event where an error occurs. An operation flow in the case where the event is not an event where an error occurs is described first.

In the case where the event is a predetermined event to be stored, the user terminal 110 stores 404 the event as an operation log. An example of the event to be stored is an event that occurs as a result of the user 190 operating an input device such as a keyboard and a mouse. An event that constantly occurs, such as a timer event, may be excluded from the event to be stored. An event that occurs when a cursor of a mouse or the like simply moves may also be excluded from the event to be stored. Meanwhile, an event when the cursor enters a different UI element or an event when the cursor moves out of a UI element, even though it is an event that occurs when the cursor moves, may be set as the event to be stored. Likewise, an event when the software starts and an event when the software ends may be set as the event to be stored.

A storage medium in which the user terminal 110 stores the event may be a volatile storage medium such as a RAM included in the user terminal 110, or a nonvolatile storage medium such as a disk device included in the user terminal 110. The stored event may include information identifying a UI element when the event occurs, and information identifying a type of the event such as click. Alternatively, the stored event may be information indicating a user operation, such as "click New Mail button" illustrated in FIG. 2 and the like. For example, the information indicating the user operation may be specified from "New Mail button" which may be the UI element when the event occurs and "click" which is the type of the event.

The user terminal 110 may determine 406 whether or not a total number of stored events is equal to or more than a predetermined reference value. In the case where the total number of stored events is equal to or more than the reference value, the user terminal 110 may transmit 408 the stored events to the server 100 as log information. Having completed the transmission 408, the user terminal 110 may execute an internal process relating to the determination 406 and the transmission 408, such as flushing the stored data or resetting a counter for counting the number of stored events.

The user terminal 110 then may execute a process 410 of the event that occurs. This process may be a process executed by a software body, such as a process executed in the case of clicking the New Mail button in mail software.

After 410, the user terminal 110 determines 412 whether or not to end the software. In the case of ending the software, if there is any stored event not transmitted to the server 100, the user terminal 110 transmits 414 such stored events to the server 100 as log information. After 414, the user terminal 110 may end the software operation. In the case of not ending the software, the user terminal 110 returns to 402.

On the other hand, in the case where the event that occurs is not the predetermined event to be stored in 402, the user terminal 110 goes to step 410. In the case where the number of stored events is less than the reference value in 406, the user terminal 110 goes to 410. Here, the user terminal 110 may execute a necessary internal process such as incrementing the counter for counting the number of stored events.

In the case where the event is determined as an event where an error occurs in 402, the user terminal 110 executes 422 a workaround process for avoiding the error. Whether or not the event is an event where an error occurs can be determined depending on whether or not an event corresponding to the operating procedure of the operating procedure information 241 illustrated in FIG. 2 occurs.

In 422, the user terminal 110 performs a process relating to the workaround 240 illustrated in FIG. 2. In detail, the user terminal 110 executes the process indicated by the execution process information 243. As an example, the user terminal 110 transfers processing to a function that implements the process indicated by the execution process information 243. As another example, a process of presenting information representing the execution process information 243 to the user 190 may be performed in 422. For instance, a message such as "Please save draft before clicking Send button" or "You are recommended to save draft" is displayed. Even in the case where the user 190 performs an operation where an error occurs, the execution of the process relating to the workaround allows the user 190 to avoid the error. After 422, the user terminal 110 goes to 412.

As described in this process flow, the user terminal 110 may acquire a plurality of events indicating an operating procedure and may provide the acquired events to the server 100. Note here that which event is to be stored may be set by the user 190 by a setting file or the like. For example, the user 190 who does not want to transmit a keyboard operation may set the keyboard operation as an event not to be stored. In this way, a system may offer high convenience to the user 190 while taking privacy into consideration. The user 190 who transmits more operation information may have a greater chance of being provided with a workaround as a result of accumulation of workarounds based on more accurate operation information, and therefore may have a higher probability of avoiding the error.

Though events are transmitted to the server 100 in the case where the number of events is equal to or more than the reference value in this example, the determination of whether or not the number of events is equal to or more than the reference value may be replaced with determination of whether or not a predetermined period has elapsed from when events are transmitted last time. Moreover, events may be transmitted to the server 100 in the case where the number of events is equal to or more than the reference value or in the case where the predetermined period has elapsed from when events are transmitted last time.

Figure 5:
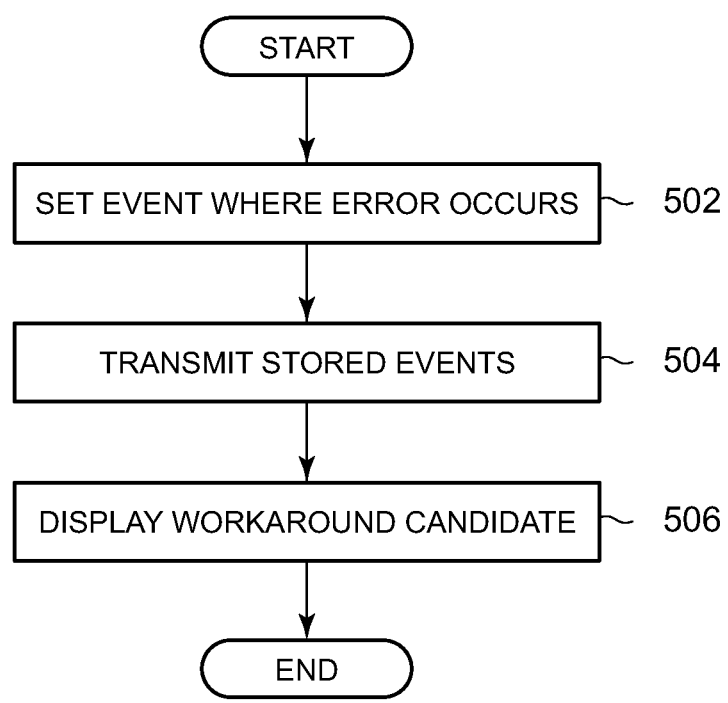
FIG. 5 is a diagram showing an example of a process flow in the case where an error occurs.

FIG. 5 shows an example of a process flow in the case where an error occurs. This process may be realized by a software module that is incorporated in the software so as to be called and executed in the case where the error occurs.

In 502, the user terminal 110 may set an event where the error occurs. In detail, the user terminal 110 may add information indicating the error to an operation log, as shown by the log information 200 in FIG. 2. In the case where there is any event not transmitted to the server 100, the user terminal 110 may transmit 504 the information indicating the error to the server 100 together with such events, as log information. The user terminal 110 then waits for a workaround candidate to be transmitted from the server 100. Upon receiving the workaround candidate, the user terminal 110 may display 506 the workaround candidate to the user 190. An example of the workaround candidate is the workaround 230 in FIG. 2.

In the system according to the embodiment, the server 100 may accumulate operating procedures in which an error occurs and operating procedures in which no error occurs, so that a workaround candidate may be provided to the user 190 when the user 190 is using the user terminal 110. This may allow the user 190 to be promptly provided with a practical workaround, as compared with the case where the developer 180 examines a workaround after receiving a fault report.

Note that this process flow may be called in the case where an internal error, such as a contradiction of an internal variable in the software, occurs. This process flow may also be registered in an operating system or the like so as to be called and executed in the case of an abnormal end of software execution.

Figure 6:
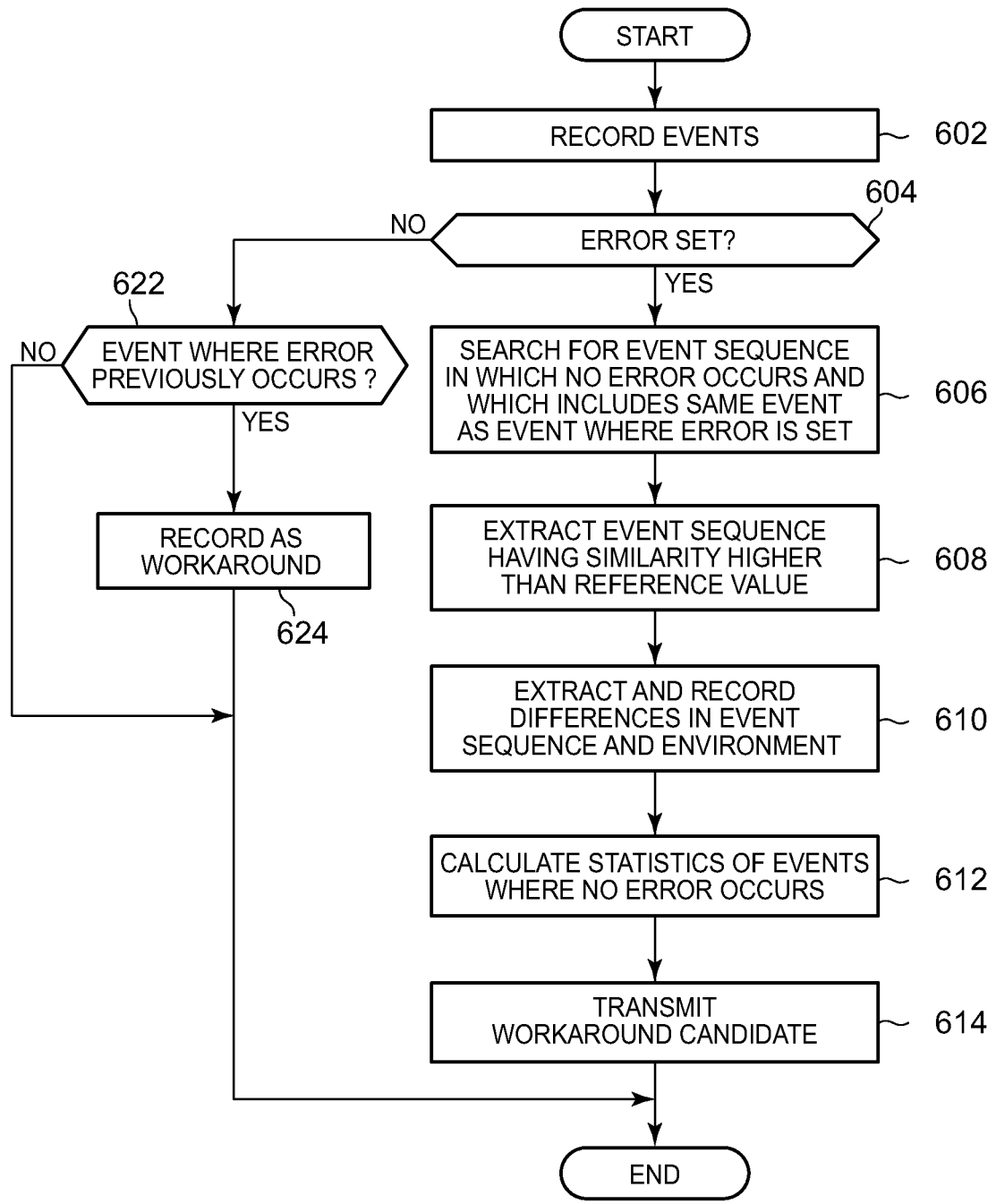
FIG. 6 is a diagram showing an example of a process flow in a server 100.

FIG. 6 shows an example of a process flow in the server 100. This process flow starts in the case where the server 100 may receive log information from the user terminal 110. The analysis device 102 may record 602 the received log information in the storage device 104. The analysis device 102 may determine 604 whether or not an error is set in the received log information.

In the case where the error is set 604 in the received log information, the analysis device 102 may search 606 log information recorded in the storage device 104, for an event sequence which may include the same event as an event corresponding to the error and in which no error is set. Thus, the analysis device 102 may function as a search section for searching the storage device 104 for the log information corresponding to the operating procedure that may include at least an operation matching an operation where the error occurs.

The analysis device 102 may extract 606, from the event sequences searched for in 606, an event sequence whose similarity to an event sequence received from the user terminal 110 is higher than a predetermined reference value. That is, the analysis device 102 may search the storage device 104 for the log information corresponding to the operating procedure which may include the operation matching the operation where the error occurs, which may be similar to the operating procedure in which the error may occur, and which may include no error.

The analysis device 102 may compare 610 each event sequence extracted in 608 with the event sequence received from the user terminal 110, extracts differences in event sequence and operating environment, and records the differences in the storage device 104. For example, the analysis device 102 may extract differences relating to the OS information 211, the operation setting parameter 212, and the operation 213 illustrated in FIG. 2. The analysis device 102 may calculate 612 statistic information of the event sequence extracted in 608. In this way, statistic information based on events where no error occurs may be calculated as shown by the OS information 131, the setting information 132, and the operation information 133 illustrated in FIG. 1. Thus, the analysis device 102 may function as an operating procedure analysis section for calculating statistic information of operating procedures similar to the operating procedure in which the error occurs, based on a plurality of operating procedures included in the log information searched for in the storage device 104.

The analysis device 102 may then transmit 614 a workaround candidate to the user terminal 110. An example of the workaround candidate may be information including the statistic information calculated in 612, i.e. the workaround 230 illustrated in FIG. 2. In the case where a workaround procedure described later is recorded in the storage device 104, the workaround candidate including the workaround procedure may be transmitted to the user terminal 110. In so doing, the analysis device 102 may provide the user 190 with the statistic information of the operating procedures similar to the error operation. Here, the analysis device 102 may record the workaround candidate in the storage device 104 in association with the event sequence received from the user terminal 110. Such workaround information recorded in the storage device 104 may be utilized as data for the developer 180, as described later. After 614, the analysis device 102 may end the process flow.

In the case where no error is set 604 in the received log information, on the other hand, the analysis device 102 may determine 622 whether or not the event is an event where the error previously occurs. In detail, the analysis device 102 may search log information received from the user terminal 110 within a predetermined period and, in the case where the same event where the error is set is found as a result of the search, may determine that the event is an event where the error previously occurs. In the case where the event is not an event where the error previously occurs, the analysis device 102 may end the process flow.

In the case where the event is an event where the error previously occurs in 622, the analysis device 102 may record 624 the operating procedure indicated by the currently received event sequence, in the storage device 104 as a workaround procedure that may avoid the error. Since the user 190 receives the workaround 230 from the server 100, the user 190 may retry operation based on the workaround, as mentioned earlier. In the case where no error occurs as a result of the user 190 retrying operation, corresponding log information may be collected as an event sequence in which no error occurs. Accordingly, there may be a high possibility that the currently received operating procedure is the workaround procedure that may avoid the error in the user terminal 110. Particularly in the case where the log information is collected within the predetermined period as the event sequence in which no error occurs, there may be a high possibility that the user 190 retries operation and as a result succeeds in avoiding the error.

Hence, by recording the current operating procedure as a workaround procedure, the analysis device 102 may record a very effective workaround procedure for the same user 190. This workaround procedure may be effective in avoiding the error for the other users 190. Accordingly, the analysis device 102 may transmit the workaround procedure recorded in 624, to the user terminal 110 in 614. The workaround procedure may be transmitted to the user terminal 110 as the execution process information 243 illustrated in FIG. 2 so as to be executed by the user terminal 110.

As described with regard to 622 and 624, in the case where a second operating procedure provided by the analysis device 102 in response to receiving log information corresponding to a first operating procedure in which the error occurs may be collected as an operating procedure that includes no error, the storage device 104 may further accumulate the second operating procedure in association with the first operating procedure. Moreover, the analysis device 102 may provide the user 190 with the second operating procedure, as an operating procedure for avoiding the error that occurs in the first operating procedure.

Figure 7:
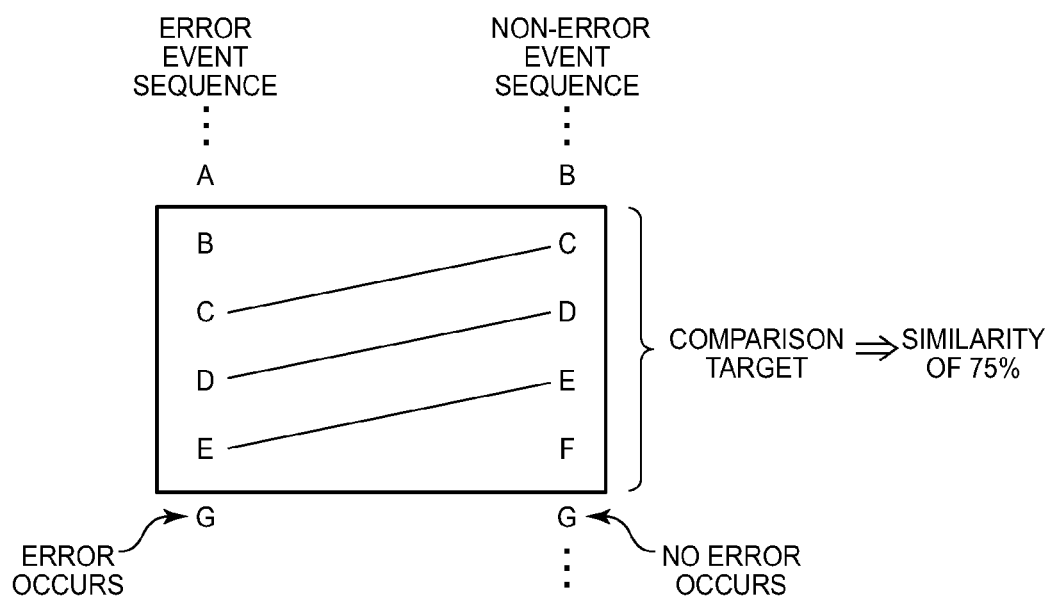
FIG. 7 is a diagram explaining similarity between event sequences.

FIG. 7 is a diagram explaining similarity between event sequences. An example of a process of calculating similarity between an error event sequence and a non-error event sequence is shown in FIG. 7.

The error event sequence may indicate an operating procedure in the case where an error occurs. The error event sequence may include an event A, an event B, an event C, an event D, an event E, and an event G in chronological order, where the error may occur after the event G The non-error event sequence may indicate an operating procedure in the case where no error occurs. The non-error event sequence may include the event B, the event C, the event D, the event E, an event F, and the event G, where no error occurs after the event G The analysis device 102 may set an event sequence of a predetermined number of events preceding the event G where the error occurs, as a comparison target. In FIG. 7, an event sequence of four preceding events may be set as a comparison target, for simplicity's sake. That is, an event sequence made up of the event B, the event C, the event D, and the event E in the error event sequence and an event sequence made up of the event C, the event D, the event E, and the event F in the non-error event sequence may each be set as a comparison target. The analysis device 102 may calculate a value obtained by dividing the number of events included in both event sequences by the total number of events of the comparison target, as the similarity. In this example, the three events C, D, and E may be included in both event sequences, so that the similarity is 75%. Thus, the analysis device 102 may search the storage device 104 for log information corresponding to an operating procedure, which may be similar to an operating procedure in which an error occurs and which may include no error, in an operating procedure preceding an operation where the error occurs.

Though the order in which the events occur may not particularly taken into consideration in this example for easier understanding of the concept of similarity, the similarity may be calculated in consideration of the event occurrence order in the event sequence. For instance, the analysis device 102 may calculate the similarity using, as the above-mentioned number of events included in both event sequences, the number of events that are included in both event sequences and for which a difference in event occurrence order between the two event sequences is less than a predetermined reference value.

Though the event sequence of the predetermined number of events may be set as the comparison target in this example for easier understanding of the concept of similarity, an event sequence of events that occur within a predetermined period may instead be set as the comparison target. In the case of setting the event sequence of events that occur within the predetermined period as the comparison target, there is a possibility that the number of events differs significantly depending on a difference in operating speed and the like of the user 190. In the case where the difference in the number of events exceeds a predetermined value, the comparison may be performed by adjusting an event sequence of a larger number of events to the number of events of an event sequence of a smaller number of events. For instance, the number of events may be adjusted by selecting events in reverse chronological order from the event sequence of the larger number of events. Note that the predetermined number or the predetermined period for specifying the events which constitute the comparison target may be adjustable by, for example, an operating parameter for setting the operation of the analysis device 102.

In the example shown in FIG. 7, the similarity may be calculated based on the matching events. Comparing these events enables an appropriate comparison target. For example, consider a situation where software may be implemented so that the same mail saving function may be executed by any of a keyboard operation and a mouse operation. There is the case where, even when executing the same function, different processes may be performed in the software for the keyboard operation and the mouse operation. This may raise a possibility that different errors occur from the different processes. In the example shown in FIG. 7, such a possibility may be eliminated by calculating the similarity based on the matching events. This may enable an effective comparison target. On the other hand, there may also be the case where an error is irrelevant to UI-related processing and the like and may be caused by code that implements a function. In such a case, the same result may be obtained even by a method of comparison on a function-by-function basis. Hence, the similarity calculation method may not be limited to the example shown in FIG. 7.

Figure 8:
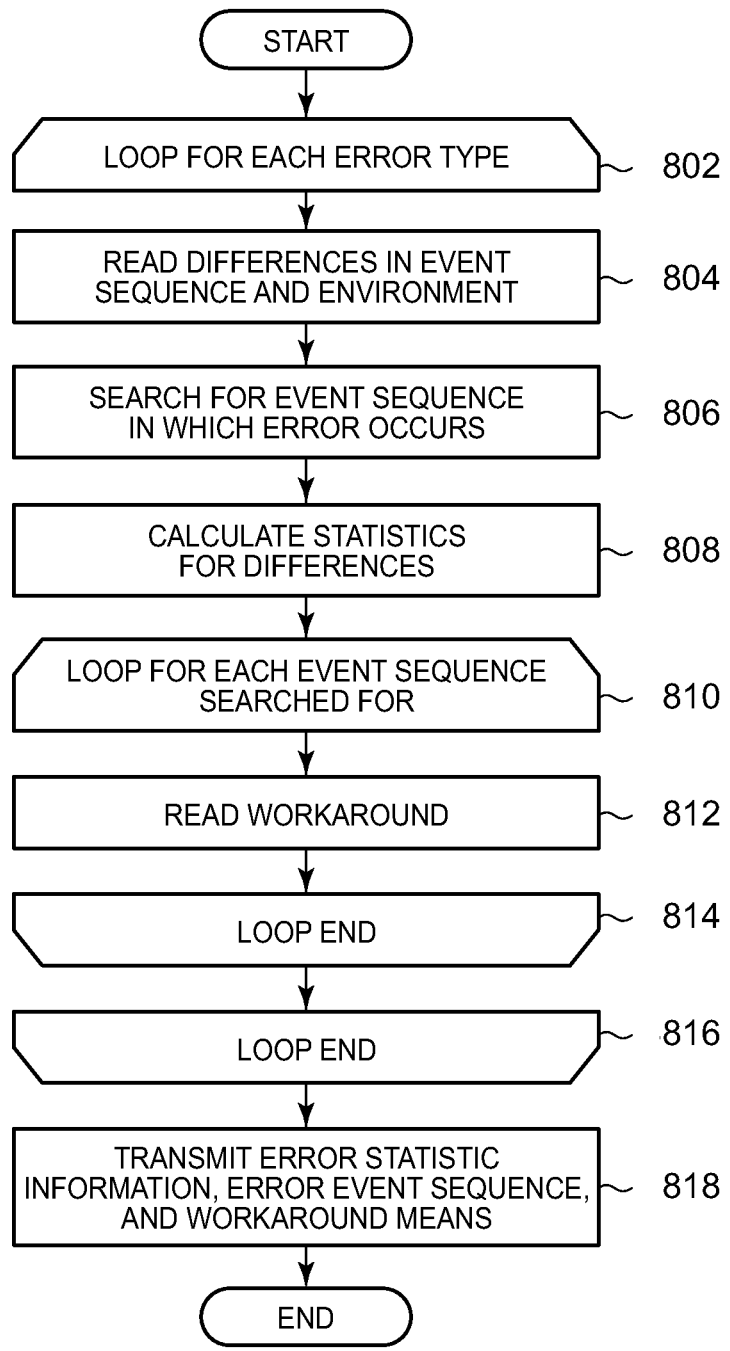
FIG. 8 is a diagram showing an example of an operating flow in the server 100.

FIG. 8 shows an example of an operation flow in the case where the server 100 may transmit the error-related information 310. For instance, this process may be periodically executed at predetermined time intervals. The analysis device 102 may search the log information accumulated in the storage device 104 for each event where an error occurs, and may start 802 a loop for each error type. 804 to 814 may be performed for each type of operation where an error occurs such as "error that occurs when pressing Send button".

The analysis device 102 may read 804 differences in event sequence and operating environment. For instance, the analysis device 102 may read the differences extracted and recorded in the storage device 104 in 610 in FIG. 6, from the storage device 104. As an example, the analysis device 102 may read the differences relating to the OS information 211, the operation setting parameter 212, and the operation 213 illustrated in FIG. 2.

The analysis device 102 may search 806 the storage device 104 for the error of the type subjected to the loop, and may extract each event sequence in which the error occurs. The analysis device 102 may then calculate 808 statistics for the differences read in 804. For example, the analysis device 102 may calculate an occurrence frequency of the error of the type subjected to the loop and an occurrence frequency of the error for each difference, as shown by the error statistics 320 in FIG. 3.

Next, the analysis device 102 may start 810 a loop for each event sequence searched for in 806. In this loop, a workaround for each event sequence searched for may be read from the storage device 104. In detail, in the case where a workaround candidate may be recorded in the storage device 104, the analysis device 102 may read 812 the workaround candidate from the storage device 104, as described with regard to 614.

814 may correspond to an end of the loop that starts in 810. 816 may correspond to an end of the loop that starts in 802. After these loops end, the analysis device 102 may transmit 818 error statistic information such as the error statistics 320 in FIG. 3, an error event sequence such as the error operating environment 330 in FIG. 3, and a workaround such as the workaround 340 in FIG. 3, to the development computer 120. That is, the error-related information 310 illustrated in FIG. 3 may be transmitted to the development computer 120. After 818, the analysis device 102 may end the process flow.

As described in 806, 808, and 818, the analysis device 102 may function as an error operating procedure extraction section for extracting a plurality of operating procedures including an operation where a specific error occurs, from the storage device 104, and an error operating procedure analysis section for calculating statistic information of operating procedures which include the operation and in which the error occurs and operating procedures which include the operation and in which no error occurs, based on the extracted plurality of operating procedures. The analysis device 102 may provide the developer 180 with the calculated statistic information.

Though the above describes the case where the workaround candidate is read from the storage device 104 in 812, the analysis device 102 may specify, based on the log information accumulated in the storage device 104, a workaround adopted by the user 190 in order to avoid the error, and may provide the specified workaround to the developer 180. For example, the analysis device 102 may search the storage device 104 for an operating procedure that may be performed after the operating procedure in which the error occurs and which may include no error. The analysis device 102 may then provide the developer 180 with the operating procedure in which the error occurs and the operating procedure. Thus, a workaround that the user 190 knows from experience or a workaround that the user 190 performs accidentally may be provided to the developer 180.

As described in the above-mentioned process flow, in the case where the user terminal 110 detects the operating procedure in which the error occurs, the analysis device 102 may provide the user terminal 110 with the operating procedure which includes no error so that the user is provided with the operating procedure which is similar to the detected operating procedure and which includes no error. Here, "the user is provided with the operating procedure which is similar to the detected operating procedure and which includes no error" may include executing the process indicated by the execution process information 243 and presenting the information representing the execution process information 243 to the user 190, as described with regard to 422. Hence, in the case where the user 190 may perform such an operation that induces an error, the analysis device 102 may cause the user terminal 110 to display a warning on a screen of the user terminal 110 or automatically execute a process for avoiding the error.

The above describes the operation of the system in which the server 100 acquires log information of an operating environment including an operating procedure from the user terminal 110 and provides the user 190 or the developer 180 with an operating procedure which may be similar to the operating procedure and which includes no error. However, the server 100 may not necessarily acquire information of an operating procedure from the user terminal 110. For example, the server 100 may acquire log information of an operating environment from the user terminal 110 and, in response to receiving log information corresponding to an operating environment in which an error occurs, search the storage device 104 for log information corresponding to an operating environment which is similar to the operating environment in which the error occurs and which includes no error, and provide the user 190 or the developer 180 with the operating environment included in the log information searched for. This may also enable the user 190 or the developer 180 to know which operating environment can avoid the error.

The above describes the case where the server 100 may collect and accumulate log information transmitted from the user terminals 110. However, the server 100 may, upon receiving log information corresponding to an operating procedure in which an error occurs from any of the user terminals 110, start accumulating log information corresponding to an operating procedure that is similar to the operating procedure in which the error occurs. This may eliminate the need for the analysis device 102 to process log information relating to operating procedures in which no error occurs, so that a load when processing log information can be reduced. Besides, a storage space of the storage device 104 may be saved, which may also contribute to a shorter search time.

The user terminal 110 may be an information processing device such as a personal computer or a mobile phone. Though the above describes the system in which the user terminal 110 and the server 100 are separate devices, the user terminal 110 may have at least a part of the functions of the server 100. For example, the user terminal 110 may have the functions of the analysis device 102. Moreover, the user terminal 110 may have the functions of the server 100. In the case where the user terminal 110 has the functions of the server 100, the user terminal 110 may collect log information of an operating environment from the other user terminals 110. Alternatively, the user terminal 110 may collect only log information of an operating environment of the user terminal 110 itself, without collecting log information of an operating environment from the other user terminals 110.

Figure 9:
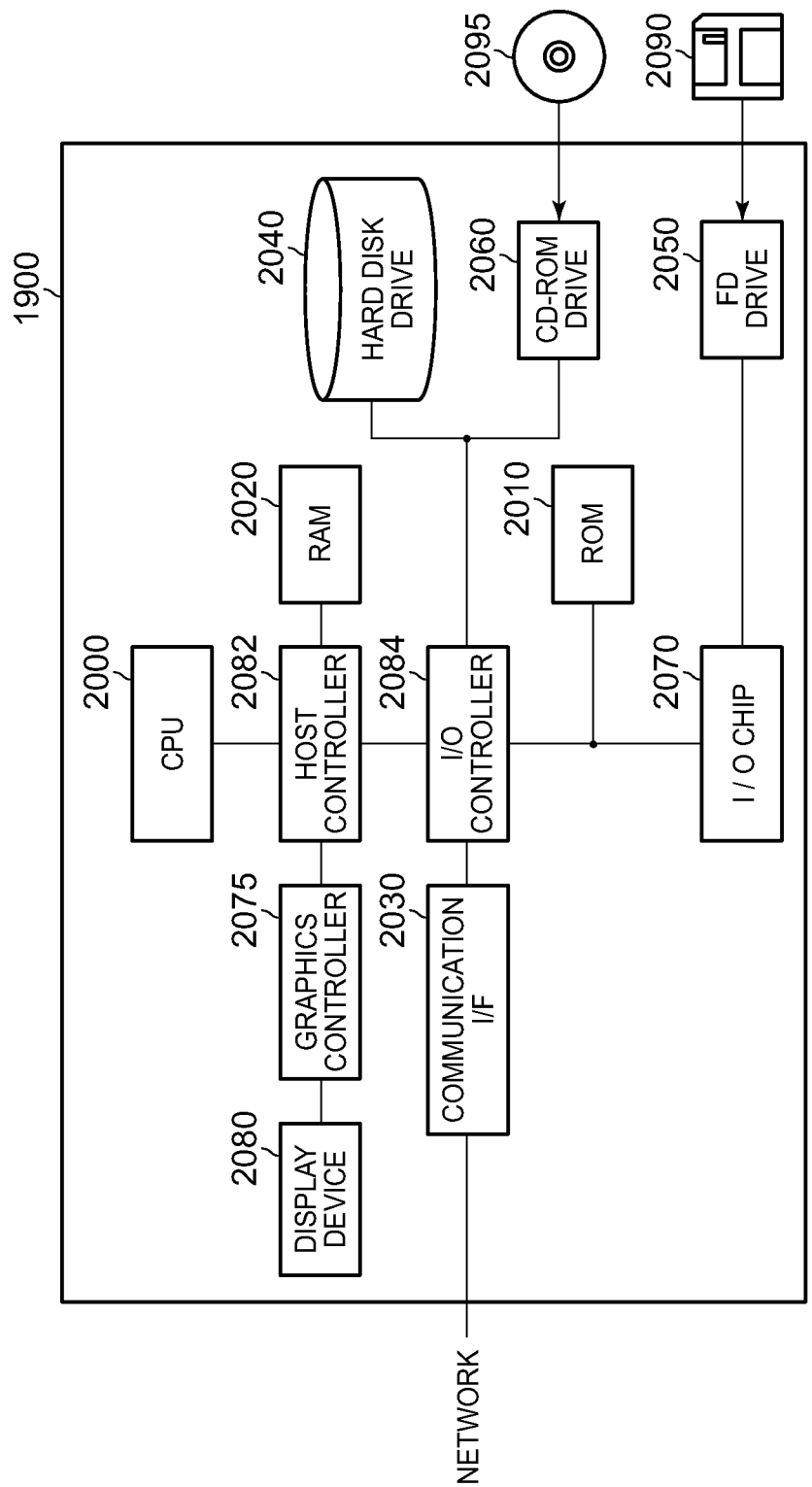
FIG. 9 is a diagram showing an example of a hardware structure of a computer 1900.

FIG. 9 shows an example of a hardware structure of a computer 1900 according to the embodiment. The computer 1900 according to the embodiment includes: a CPU periphery including a CPU 2000, a RAM 2020, a graphics controller 2075, and a display device 2080 that are connected to each other by a host controller 2082; an input/output section including a communication interface 2030, a hard disk drive 2040, and a CD-ROM drive 2060 that are connected to the host controller 2082 by an input/output controller 2084; and a legacy input/output section including a ROM 2010, a flexible disk drive 2050, and an input/output chip 2070 that are connected to the input/output controller 2084.

The host controller 2082 may connect the RAM 2020 with the CPU 2000 and the graphics controller 2075 that access the RAM 2020 at a high transfer rate. The CPU 2000 may operate based on a program stored in the ROM 2010 and the RAM 2020, and may control each section. The graphics controller 2075 may acquire image data generated on a frame buffer in the RAM 2020 by the CPU 2000 and the like, and may display the image data on the display device 2080. As an alternative, the graphics controller 2075 may include a frame buffer for storing image data generated by the CPU 2000 and the like.

The input/output controller 2084 may connect the host controller 2082 with the communication interface 2030, the hard disk drive 2040, and the CD-ROM drive 2060 that may be relatively fast input/output devices. The communication interface 2030 may communicate with another device via a network. The hard disk drive 2040 may store a program and data used by the CPU 2000 in the computer 1900. The CD-ROM drive 2060 may read a program or data from a CD-ROM 2095, and may provide the read program or data to the hard disk drive 2040 via the RAM 2020.

The input/output controller 2084 may be connected with the ROM 2010 and the flexible disk drive 2050 and the input/output chip 2070 that are relatively slow input/output devices. The ROM 2010 may store a boot program executed upon start of the computer 1900, and/or a program and the like dependent on hardware of the computer 1900. The flexible disk drive 2050 may read a program or data from a flexible disk 2090, and may provide the read program or data to the hard disk drive 2040 via the RAM 2020. The input/output chip 2070 may connect the flexible disk drive 2050 to the input/output controller 2084, and may also connect various input/output devices to the input/output controller 2084 via a parallel port, a serial port, a keyboard port, a mouse port, and the like.

A program provided to the hard disk drive 2040 via the RAM 2020 may be stored in a recording medium such as the flexible disk 2090, the CD-ROM 2095, or an IC card and may be provided by the user. The program may be read from the recording medium, may be installed in the hard disk drive 2040 in the computer 1900 via the RAM 2020, and may be executed by the CPU 2000. A program installed in the computer 1900 may cause the computer 1900 to function as each section of the server 100 described with reference to FIGS. 1 to 8. The program installed in the computer 1900 may also realize the function of each section of the server 100 and the user terminal 110 described with reference to FIGS. 1 to 8.

Information processing described in such a program is read by the computer 1900, thereby functioning as specific means realized by cooperation between the software and the above-mentioned various hardware resources. Moreover, information processing described in such a program may be read by the computer 1900, thereby functioning as the server 100 and the user terminal 110 which are specific means realized by cooperation between the software and the above-mentioned various hardware resources. The specific means may achieve information computation or processing according to the intended use of the computer 1900 in the embodiment, as a result of which the specific server 100 and user terminal 110 according to the intended use may be provided.

As an example, in the case where the computer 1900 may communicate with an external device or the like, the CPU 2000 may execute a communication program loaded into the RAM 2020, and may instruct the communication interface 2030 to perform communication processing based on a process described in the communication program. Under control of the CPU 2000, the communication interface 2030 may read transmission data stored in a transmission buffer area or the like in a storage device such as the RAM 2020, the hard disk drive 2040, the flexible disk 2090, or the CD-ROM 2095 and may transmit the read transmission data to the network, or may write reception data received from the network to a reception buffer area or the like in the storage device. Thus, the communication interface 2030 may transfer the transmission/reception data with the storage device by DMA (direct memory access). Alternatively, the CPU 2000 may transfer the transmission/reception data by reading the data from the storage device or the communication interface 2030 as a transfer source and writing the data to the communication interface 2030 or the storage device as a transfer destination.

The CPU 2000 also may cause all or necessary part of files, databases, and the like stored in an external storage device such as the hard disk drive 2040, the CD-ROM drive 2060 (the CD-ROM 2095), and the flexible disk drive 2050 (the flexible disk 2090) to be read into the RAM 2020 by DMA transfer or the like, and may perform various processing on the data in the RAM 2020. The CPU 2000 may write the processed data back to the external storage device by DMA transfer or the like. In such processing, the RAM 2020 may be regarded as temporarily holding the data stored in the external storage device, and so the RAM 2020 and the external storage device or the like may be collectively referred to as a memory, a storage section, a storage device, and the like in the embodiment. Various information such as various programs, data, tables, and databases in the embodiment may be stored in such a storage device and subjected to information processing. Note that the CPU 2000 may also be capable of retaining part of the RAM 2020 in a cache memory and performing read/write in the cache memory. In this case, the cache memory may serve as part of the functions of the RAM 2020, and accordingly it may be assumed in this embodiment that the cache memory may also be included in the RAM 2020, the memory, and/or the storage device, unless separately defined.

The CPU 2000 further performs, on data read from the RAM 2020, various processing including various computation, information processing, conditional determination, and information search and replacement described in the embodiment as designated by a sequence of instructions in a program, and writes the processed data back to the RAM 2020. For instance, in the case of performing conditional determination, the CPU 2000 determines whether or not each variable described in the embodiment satisfies a condition such as more than, less than, equal to or more than, equal to or less than, or equal to another variable or a constant and, when the condition is satisfied (or the condition is not satisfied), branches to a different sequence of instructions or calls a subroutine.

The above-mentioned program or module may be stored in an external recording medium. Examples of the recording medium include not only the flexible disk 2090 and the CD-ROM 2095 but also an optical recording medium such as a DVD or a CD, a magneto-optical recording medium such as an MO, a tape medium, a semiconductor memory such as an IC card, and so on. Moreover, a storage device such as a hard disk or a RAM in a server system connected to a dedicated communication network or the Internet may be used as the recording medium to provide the program to the computer 1900 via the network.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to explain the principles of the disclosure and the practical application, and to enable others of ordinary skill in the art to understand the disclosure for various embodiments with various modifications as are suited to the particular use contemplated.

What is claimed is:

1. A computing system including a processor and memory configured to perform operations comprising:
    collecting log information on an operating environment including a first operating procedure from a computing device associated with a user;
    accumulating the collected log information;
    identifying, from the log information, a second operating procedure similar to the first operating procedure, wherein the second operating procedure had an error occur and no longer includes the error, in response to receiving the log information corresponding to the first operating procedure in which the error occurs;
    providing the user with the second operating procedure included in the searched log information, including a workaround environment including a type of operating system in which the error does not occur and a software setting operation in which the error does not occur; and
    providing a developer and the user with error-related information including operations performed by the user that caused the error.

2. The computing system of claim 1, wherein the identifying the second operating procedure further comprises searching the accumulated collected log information for the second operating procedure which includes at least a first operation matching a second operation where the error occurred.

3. The computing system of claim 2, further comprising identifying, from the log information, the second operating procedure which includes at least the first operation matching the second operation where the error occurred, is similar to the first operating procedure in which the error occurred, and includes no error.

4. The computing system of claim 1, further comprising:
    calculating statistic information of the second operating procedure similar to the first operating procedure in which the error occurred, based upon, at least in part, a plurality of operating procedures included in the searched log information; and providing the computing device associated with the user with the calculated statistic information.

5. The computing system of claim 1, further comprising:
detecting a third operating procedure in which the error occurred;
providing the computing device associated with the user with a fourth operating procedure which includes no error, wherein the fourth operating procedure is similar to the detected third operating procedure and which includes no error.

6. The computing system of claim 1, further comprising:
collecting a third operating procedure in which an error occurred and no longer includes the error;
providing a fourth operating procedure in response to receiving log information corresponding to the third operating procedure in which the error occurred;
accumulating the fourth operating procedure in association with the third operating procedure; and
providing the computing device associated with the user with the fourth operating procedure as an operating procedure for avoiding the error that occurred in the third operating procedure.

7. The computing system of claim 1, further comprising:
extracting a plurality of operating procedures including a first operation;
calculating statistic information of the plurality of operating procedures which include at least a third operating procedure from the plurality of operating procedures which includes the first operation and where the error occurred in the third operating procedure and at least a fourth operating procedure from the plurality of operating procedures which includes the first operation and in which no error occurred; and
providing the computing device associated with the user with the calculated statistic information.

8. The computing system of claim 1, further comprising:
identifying from the collected log information a third operating procedure to be performed after the first operating procedure in which the error occurred, wherein the third operating procedure no longer includes the error; and
providing the computing device associated with the user with the first operating procedure in which the error occurred and the identified third operating procedure.

9. The computing system of claim 1, further comprising:
detecting a plurality of events generated by operations by the user, the plurality of events indicating a third operating procedure; and
collecting the log information on the operating environment including the detected plurality of events.

10. A computer program product residing on a non-transitory computer readable medium having a plurality of instructions stored thereon which, when executed by a processor, cause the processor to perform operations comprising:
collecting log information on an operating environment including a first operating procedure from a computing device associated with a user;
accumulating the collected log information;
identifying, from the log information, a second operating procedure similar to the first operating procedure, wherein the second operating procedure had an error occur and no longer includes the error, in response to receiving the log information corresponding to the first operating procedure in which the error occurs;
providing the user with the second operating procedure included in the searched log information, including a workaround environment including a type of operating system in which the error does not occur and a software setting operation in which the error does not occur; and
providing a developer and the user with error-related information including operations performed by the user that caused the error.

11. The computer program product of claim 10, wherein the identifying the second operating procedure further comprises searching the accumulated collected log information for the second operating procedure which includes at least a first operation matching a second operation where the error occurred.

12. The computer program product of claim 11, further comprising identifying, from the log information, the second operating procedure which includes at least the first operation matching the second operation where the error occurred, is similar to the first operating procedure in which the error occurred, and includes no error.

13. The computer program product of claim 10, further comprising:
calculating statistic information of the second operating procedure similar to the first operating procedure in which the error occurred, based upon, at least in part, a plurality of operating procedures included in the searched log information; and
providing the computing device associated with the user with the calculated statistic information.

14. The computer program product of claim 10, further comprising:
detecting a third operating procedure in which the error occurred;
providing the computing device associated with the user with a fourth operating procedure which includes no error, wherein the fourth operating procedure is similar to the detected third operating procedure and which includes no error.

15. The computer program product of claim 10, further comprising:
collecting a third operation procedure in which an error occurred and no longer includes the error;
providing a fourth operating procedure in response to receiving log information corresponding to the third operating procedure in which the error occurred;
accumulating the fourth operating procedure in association with the third operating procedure; and
providing the computing device associated with the user with the fourth operating procedure as an operating procedure for avoiding the error that occurred in the third operating procedure.

16. The computer program product of claim 10, further comprising:
extracting a plurality of operating procedures including a first operation;
calculating statistic information of the plurality of operating procedures which include at least a third operating procedure from the plurality of operating procedures which includes the first operation and where the error occurred in the third operating procedure and at least a fourth operating procedure from the plurality of operating procedures which includes the first operation and in which no error occurred; and
providing the computing device associated with the user with the calculated statistic information.

17. The computer program product of claim 10, further comprising:
identifying from the collected log information a third operating procedure to be performed after the first operating procedure in which the error occurred, wherein the third operating procedure no longer includes the error; and providing the computing device associated with the user with the first operating procedure in which the error occurred and the identified third operating procedure.

18. The computer program product of claim 10, further comprising:

detecting a plurality of events generated by operations by the user, the plurality of events indicating a third operating procedure; and collecting the log information on the operating environment including the detected plurality of events.

19. A computer-implemented method comprising:

collecting log information on an operating environment including a first operating procedure from a computing device associated with a user;

accumulating the collected log information;

identifying, from the log information, a second operating procedure similar to the first operating procedure, wherein the second operating procedure had an error occur and no longer includes the error, in response to receiving the log information corresponding to the first operating procedure in which the error occurs; and providing the user with the second operating procedure included in the searched log information, including a workaround environment including a type of operating system in which the error does not occur and a software setting operation in which the error does not occur; and providing a developer and the user with error-related information including operations performed by the user that caused the error.

20. The computer-implemented method of claim 19, wherein the identifying the second operating procedure further comprises searching the accumulated collected log information for the second operating procedure which includes at least a first operation matching a second operation where the error occurred.

21. The computer-implemented method of claim 20, further comprising identifying, from the log information, the second operating procedure which includes at least the first operation matching the second operation where the error occurred, is similar to the first operating procedure in which the error occurred, and includes no error.

22. The computer-implemented method of claim 19, further comprising:

calculating statistic information of the second operating procedure similar to the first operating procedure in which the error occurred, based upon, at least in part, a plurality of operating procedures included in the searched log information; and providing the computing device associated with the user with the calculated statistic information.

23. The computer-implemented method of claim 19, further comprising:

detecting a third operating procedure in which the error occurred;

providing the computing device associated with the user with a fourth operating procedure which includes no error, wherein the fourth operating procedure is similar to the detected third operating procedure and which includes no error.

24. The computer-implemented method of claim 19, further comprising:

collecting a third operation procedure in which an error occurred and no longer includes the error;

providing a fourth operating procedure in response to receiving log information corresponding to the third operating procedure in which the error occurred;

accumulating the fourth operating procedure in association with the third operating procedure; and providing the computing device associated with the user with the fourth operating procedure as an operating procedure for avoiding the error that occurred in the third operating procedure.

25. The computer-implemented method of claim 19, further comprising:

extracting a plurality of operating procedures including a first operation;

calculating statistic information of the plurality of operating procedures which include at least a third operating procedure from the plurality of operating procedures which includes the first operation and where the error occurred in the third operating procedure and at least a fourth operating procedure from the plurality of operating procedures which includes the first operation and in which no error occurred; and providing the computing device associated with the user with the calculated statistic information.

26. The computer-implemented method of claim 19, further comprising:

identifying from the collected log information a third operating procedure to be performed after the first operating procedure in which the error occurred, wherein the third operating procedure no longer includes the error; and providing the computing device associated with the user with the first operating procedure in which the error occurred and the identified third operating procedure.

27. The computer-implemented method of claim 19, further comprising:

detecting a plurality of events generated by operations by the user, the plurality of events indicating a third operating procedure; and collecting the log information on the operating environment including the detected plurality of events.

* * * * *